US009894527B2

(12) United States Patent
Tanabe et al.

(10) Patent No.: US 9,894,527 B2
(45) Date of Patent: Feb. 13, 2018

(54) ELECTRONIC DEVICE AND CONTROL METHOD

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP); Shinya Saito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/336,807

(22) Filed: Oct. 28, 2016

(65) Prior Publication Data

US 2017/0127283 A1    May 4, 2017

(30) Foreign Application Priority Data

Oct. 29, 2015    (JP) .................. 2015-213400

(51) Int. Cl.
  *H04W 12/08*  (2009.01)
  *H04L 29/06*  (2006.01)
  *H04W 12/06*  (2009.01)
  *G06F 21/36*  (2013.01)
(52) U.S. Cl.
  CPC ............ *H04W 12/08* (2013.01); *G06F 21/36* (2013.01); *H04L 63/0861* (2013.01); *H04W 12/06* (2013.01)
(58) Field of Classification Search
  None
  See application file for complete search history.

(56) References Cited

U.S. PATENT DOCUMENTS

| 7,965,873 B2 | 6/2011 | Goto |
| 8,994,499 B2 * | 3/2015 | Zhao ............... G06F 21/32 340/5.53 |
| 2009/0064296 A1 * | 3/2009 | Aikawa ........... G06F 21/32 726/6 |
| 2010/0216509 A1 * | 8/2010 | Riemer ........... H04M 1/72577 455/557 |

(Continued)

FOREIGN PATENT DOCUMENTS

| JP | 2007-310638 A | 11/2007 |
| JP | 2010-231397 A | 10/2010 |
| JP | 2017-11474 A | 1/2017 |

OTHER PUBLICATIONS

Office Action in JP Application No. 2015-213400, dated Feb. 7, 2017.

*Primary Examiner* — Moustapha Diaby
(74) *Attorney, Agent, or Firm* — Hauptman Ham, LLP

(57) ABSTRACT

An electronic device includes a controller that changes an authentication level that is used to perform unlocking on locking based on a locking function according to a travel state of a user. The controller acquires first biometric information that is acquired by a biometric information acquisition module in association with an unlocking operation, determines an unlocking condition on the basis of the changed authentication level, calculates a matching rate between the first biometric information and second biometric information that is set and registered in advance, and when it is determined that the matching rate satisfies the determined unlocking condition, performs unlocking on the locking.

11 Claims, 8 Drawing Sheets

(56) References Cited

U.S. PATENT DOCUMENTS

| | | |
|---|---|---|
| 2010/0245042 A1 | 9/2010 | Tsubaki |
| 2014/0187200 A1* | 7/2014 | Reitter .................. H04W 4/021 |
| | | 455/410 |
| 2015/0227926 A1* | 8/2015 | Grigg ..................... G06Q 20/40 |
| | | 705/64 |
| 2016/0088146 A1* | 3/2016 | Ying ................. H04M 1/72569 |
| | | 455/550.1 |

* cited by examiner

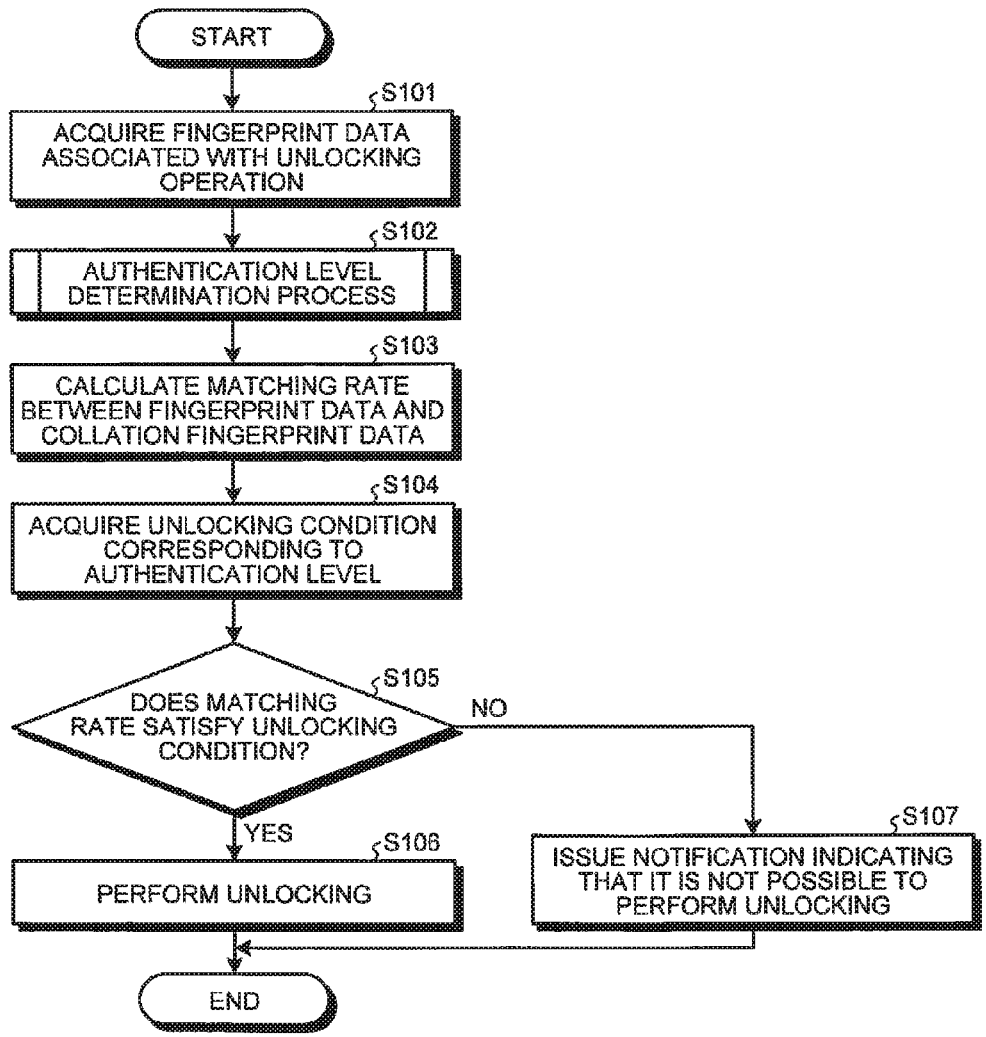

ELECTRONIC DEVICE AND CONTROL METHOD

CROSS-REFERENCE TO RELATED APPLICATION

The present application claims priority under 35 U.S.C. § 119 to Japanese Patent Application No. 2015-213400 filed in Japan on Oct. 29, 2015, entitled "ELECTRONIC DEVICE AND CONTROL METHOD". The content of which is incorporated by reference herein in its entirety.

BACKGROUND

1. Field

The present application generally relates to an electronic device and a control method.

2. Description of the Related Art

Conventionally, there is a portable device with a fingerprint authentication function that authenticates a user by collating read fingerprint data with fingerprint data that is registered in advance.

SUMMARY

In one aspect, an electronic device includes a controller that changes an authentication level that is used to perform unlocking on locking based on a locking function according to a travel state of a user.

In one aspect, a control method includes: performing first control to perform locking based on a locking function; performing second control to determine a travel state of a user according to the performing of the locking; performing third control to, after the second control, determine the travel state again in response to acceptance of an input of first biometric information, performing fourth control to change an authentication level that is used to perform unlocking on the locking on the basis of a result of determining the travel state at the second control and a result of determining the travel state at the third control; performing fifth control to determine an unlocking condition on the basis of the authentication level; performing sixth control to calculate a matching rate between the first biometric information and second biometric information that is set and registered in advance; and performing seventh control to perform unlocking on the locking when the matching rate satisfies the unlocking condition.

BRIEF DESCRIPTION OF THE DRAWINGS

FIG. 2 is a table of an exemplary configuration of an unlocking condition determination table;

FIG. 3 is a flowchart of an exemplary unlocking process performed by the smartphone;

DETAILED DESCRIPTION OF THE PREFERRED EMBODIMENTS

As in a conventional portable device, there is still room for improvement with respect to the authentication function of electronic devices.

Embodiments for carrying out the electronic device and the control method according to the present application will be described in detail below with reference to the accompanying drawings.

A smartphone will be taken and described as an example of the electronic device according to the present application. The portable electronic device may be an electronic device other than a smartphone as long as the electronic device is portable by a user, has a locking function, and determines a means of travel. For example, a device, such as a mobile phone, a tablet, a portable personal computer, a digital camera, a media player, an electronic book reader, a navigator, a pedometer, an activity meter, a wearable device, a head mounted display, a hearing aid, earphones, or a game machine, may be used. Wearable devices include watch-type, glasses-type, shoes-type, hair-accessory-type, key-type, neckless-type, collar-type, ring-type, bracelet-type, and bag-type devices.

Figure 1:
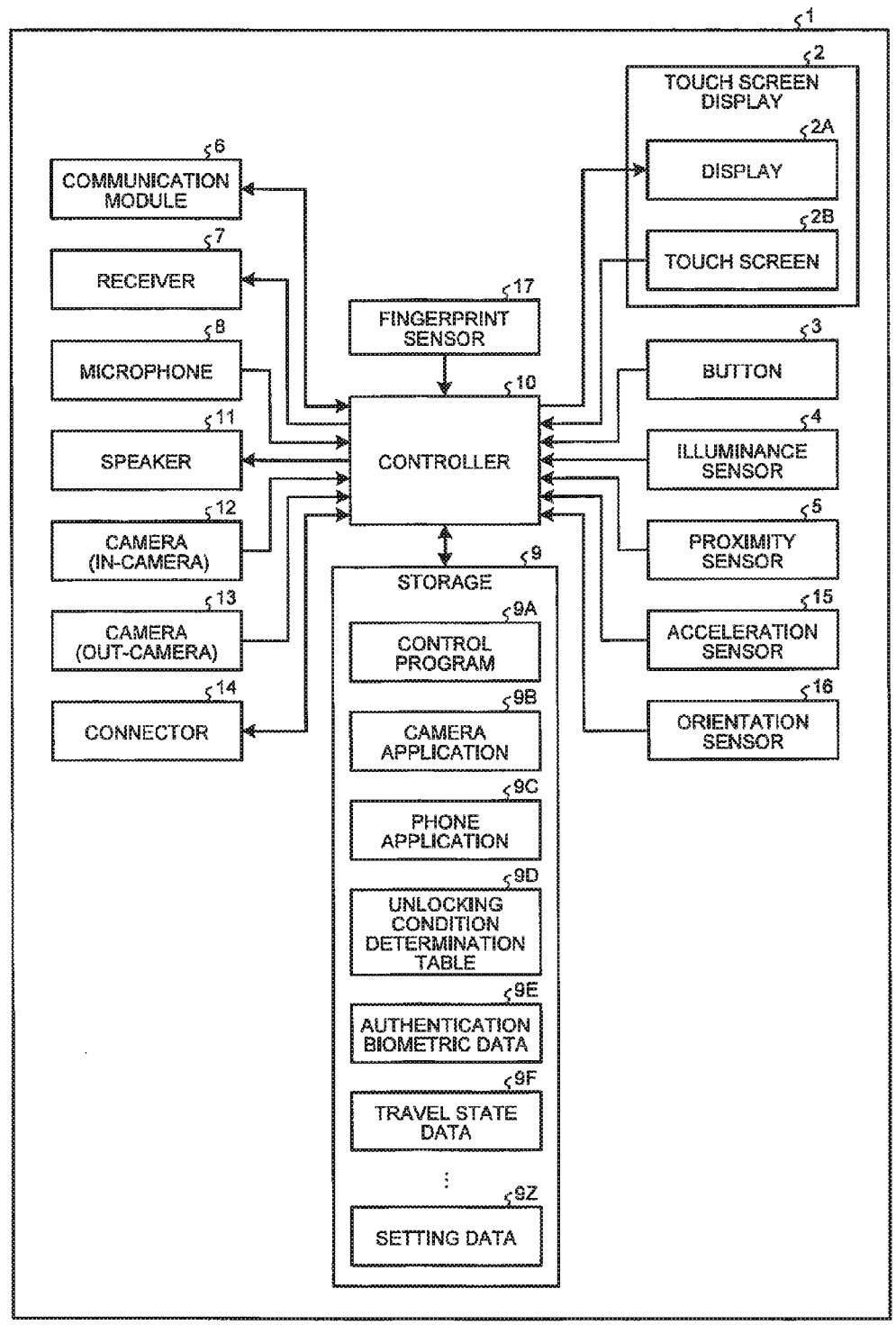
FIG. 1 is a block diagram of a functional configuration of a smartphone.

FIG. 1 is a block diagram of an exemplary functional configuration of a smartphone 1. In the following descriptions, the same components may be denoted with the same reference numbers. In the following descriptions, redundant descriptions may be omitted. In the following descriptions, the smartphone 1 may be referred to as a "subject device".

As illustrated in FIG. 1, the smartphone 1 includes a touch screen display 2, a button 3, an illuminance sensor 4, a proximity sensor 5, a communication module 6, a receiver 7, a microphone 8, a storage 9, a controller 10, a speaker 11, a camera 12, a camera 13, a connector 14, an acceleration sensor 15, an orientation sensor 16, and a fingerprint sensor 17.

The touch screen display 2 includes a display 2A and a touch screen 2B. The display 2A and the touch screen 2B, for example, may be positioned to overlap, may be positioned to be lined, or may be positioned to be separated from each other. When the display 2A and the touch screen 2B are positioned to overlap, for example, one or more sides of the display 2A are not necessarily run along any side of the touch screen 2B.

The display 2A includes a display device, such as a liquid crystal display (LCD), an organic electro-luminescence display (OELD), or an inorganic electro-luminescence display (IELD). The display 2A displays an object, such as a character, an image, a symbol, or a diagram, on a screen. The screen containing the object displayed by the display 2A includes a screen referred to as a locking screen, a screen referred to as a home screen, and an application screen that is displayed during execution of an application. The home screen may be referred to as a desktop, a standby display, an idle screen, a standard screen, an application list screen, or a launcher screen.

The touch screen 2B detects touching or proximity of, for example, a finger, a pen, or a stylus pen with respect to the touch screen 2B. The touch screen 2B is capable of detecting the position of multiple fingers, a pen, or a stylus pen on the touch screen 2B when they/it touches or is proximate to the touch screen 2B. In the following descriptions, the position on the touch screen 2B in which, for example, multiple fingers, a pen, or a stylus pen touches or is proximate to the touch screen 2B, which is the position detected by the touch screen 2B, is referred to as a "detection position". The touch screen 2B notifies the controller 10 of the touching or proximity of the fingers with respect to the touch screen 2B together with the detection position. The touch screen 2B may notify the controller 10 of the detection of touching or proximity by notifying the controller 10 of the detection position. The touch screen display 2 of the touch screen 2B is able to execute operations that the touch screen 2B is able to perform. In other words, the touch screen display 2 may perform operations performed by the touch screen 2B.

The controller 10 determines the type of a gesture on the basis of at least one of touching or proximity, a detection position, a change in the detection position, a duration of touching or proximity, an interval between sets of detection of touching or proximity, and the number of times of detection of touching that are detected by the touch screen 2B. The smartphone 1 that includes the controller 10 is able to execute operations performed by the controller 10. In other words, the smartphone 1 may perform the operations performed by the controller 10. A gesture is an operation performed on the touch screen 2B with fingers. The operations performed on the touch screen 2B may be performed on the touch screen display 2 including the touch screen 2B. Gestures to be determined by the controller 10 via the touch screen 2B includes, for example, touching, long touching, releasing, swiping, tapping, double tapping, long tapping, dragging, flicking, pinching in, and pinching out; however, the gestures are not limited to them.

Any method, for example, a capacitance method, a resistance film method, a surface acoustic wave method, an infrared method, or a load sensing method, may be used as the method of detection performed by the touch screen 2B.

The button 3 receives an operation input from a user. The number of buttons 3 may be one or more. The button 3 is an exemplary operation button.

The illuminance sensor 4 detects the illuminance.

The illuminance is a value of a flux of light incident on a unit area of a measuring surface of the illuminance sensor 4. The illuminance sensor 4 is, for example, used to adjust the luminance of the display 2A.

The proximity sensor 5 detects the existence of an adjacent object contactlessly. The proximity sensor 5 detects the existence of an object on the basis of, for example, a change in a magnetic field or a change in a time of return of a reflected wave of an ultrasonic wave. The proximity sensor 5 detects, for example, that the display 2A and a face becomes proximate to each other. The illuminance sensor 4 and the proximity sensor 5 may be configured as a single sensor. The illuminance sensor 4 may be used as a proximity sensor.

The communication module 6 communicates wirelessly. Wireless communication standards supported by the communication module 6 includes, for example, communication standards of 2G, 3G or 4G cellular phone and short-distance wireless communication standards. As the cellular phone communication standards, for example, there are, LTE (Long Term Evolution), W-CDMA (Wideband Code Division Multiple Access), WiMAX (trademark) (Worldwide Interoperability for Microwave Access), CDMA2000, PDC (Personal Digital Cellular), GSM (trademark) (Global System for Mobile Communications), and PHS (Personal Handyphone System). The short-distance wireless communication standards include, for example, IEEE802.11, Bluetooth (trademark), IrDA (Infrared Data Association), NFC (Near Field Communication), and WPAN (Wireless Personal Area Network). The WPAN communication standard includes, for example, ZigBee (trademark). The communication module 6 may support at least one of the above-described communication standards.

The receiver 7 outputs, as sound, sound signals that are transmitted from the controller 10. For example, the receiver 7 is capable of outputting sound of a moving image that is reproduced by the smartphone 1, sound of music, and voice of a person talking to on the phone. The microphone 8 converts, for example, voice of the user that is input into sound signals and transmits the sound signals to the controller 10.

The storage 9 stores programs and data. The storage 9 may be used as a work area that temporarily stores the result of processes performed by the controller 10. The storage 9 may include a semiconductor storage medium and any non-transitory storage medium, such as a magnetic storage medium. The storage 9 may include multiple types of storage media. The storage 9 may include a combination of a storage medium, such as a memory card, an optical disk, or a magneto-optical disk, and a device that reads the storage medium. The storage 9 may include a storage device, such as a random access memory (RAM), used as a temporary storage area.

The programs stored in the storage 9 include an application that is executed as a foreground application or a background application and a support program (not illustrated) that supports operations of the applications. For example, when executed as a foreground application, an application displays a screen according to the application on the display 2A. The support program includes, for example, an OS. The program may be installed in the storage 9 via wireless communications performed by the communication module 6 or a non-transitory storage medium.

The storage 9 stores, for example, a control program 9A, a camera application 9B, a phone application 9C, an unlocking condition determination table 9D, an authentication biometric data 9E, travel state data 9F, and setting data 9Z. The control program 9A can work together with various applications when providing various functions. The control program 9A may work together with a cloud storage via the communication module 6 to access files and data stored in the cloud storage. The cloud storage may store the unlocking condition determination table 9D and the authentication biometric data 9E partly or entirely.

According to some embodiments, the control program 9A may provide a function of changing the authentication level that is used to perform unlocking on locking based on the locking function in accordance with the travel state of the user. The control program 9A may determine the travel state of the user on the basis of information that is acquired from a motion sensor. The control program 9A stores the determined travel state as the travel state data 9F in the storage 9. Specifically, the control program 9A measures vibrations and motions applied to the smartphone 1 on the basis of the direction and magnitude of acceleration that are acquired from the acceleration sensor 15. The control program 9A refers to data on the vibrations and motions applied to the smartphone 1 in various travel states measured in advance and determines a travel state from the result of measuring the vibrations and motions. The storage 9 may store the data on vibrations and motions applied to the smartphone 1 in the various travel states measured in advance. The control program 9A may determine a travel state by using, as an alternative of the acceleration sensor 15 or an auxiliary, at least one of an angular speed sensor, a geomagnetic sensor, a GPS receiver, a microphone and a camera. The control program 9A may determine a travel state at a given timing. The control program 9A may determine a travel state periodically. The travel state includes a state where the subject device is placed on a still object, a stopping state where the user who carries the subject device is stopping, a walking state where the user who carries the subject device is walking, a running state where the user who carries the subject device is running, and an on-state where the user who carries the subject device is on an automobile or a train. The locking function enables a state where various operations on the subject device other than an unlocking operation are not able to be accepted. For example, the locking function locks the subject device when the light of the display 2A is turned off. The locking function includes a function of, with respect to various applications, executing an application or individually limiting a part of functions in an application.

The control program 9A, for example, acquires fingerprint data by using the fingerprint sensor 17 in accordance with the unlocking operation and calculates a matching rate between the acquired fingerprint data and collation fingerprint data that is set and registered in advance. When it is determined that the calculated matching rate satisfies an unlocking condition, the control program 9A is able to provide the function of performing unlocking. The control program 9A is able to provide a function of determining an unlocking condition on the basis of the authentication level. The control program 9A may extract pre-set characteristics after the acquired fingerprint data is digitally converted in pre-processing. The control program 9A may collate the characteristics extracted from the acquired fingerprint data and the collation fingerprint data to calculate a matching rate. When collating the characteristics extracted from the acquired fingerprint data and the collation fingerprint data, the control program 9A may use characteristics extracted from the collation fingerprint data as in the fingerprint data. Specifically, the control program 9A may perform pre-processing, such as enhancement, banalization, and thinning, on the acquired fingerprint image and extract, as the characteristics, sets of coordinates of points of ending and bifurcation of the fingerprint from the fingerprint image on which the pre-processing has been performed. The control program 9A may calculate a matching rate by collating the sets of coordinates of the points of ending and bifurcation of the fingerprint that are extracted from the acquired fingerprint image and sets of coordinates of points of ending and bifurcation of the fingerprint that are extracted from the collation fingerprint data. The pre-processing, such as enhancement, banalization, and thinning, and extraction of the sets of coordinates of points of ending and bifurcation of the fingerprint are only examples of the pre-processing method and the extracted characteristics, and the method of pre-processing performed by the control program 9A and the extracted characteristics may be modified as appropriate.

The control program 9A may provide a function of determining the travel state of the user when performing locking and performing unlocking. The control program 9A may provide a function of changing the authentication level on the basis of a first travel state that is the result of the determination made when locking is performed and a second travel state that is the result of the determination made when unlocking is performed.

The control program 9A may provide a function of lowering the authentication level to a level lower than the standard level when the first travel state and the second travel state are the same and maintaining the authentication level at the standard level when the first travel state and the second travel state are different from each other.

The camera application 9B may provide a function for performing still-image capturing, moving-image capturing, and editing and managing of images. The phone application 9C may provide a talk function for talking depending on wireless communications.

The unlocking condition determination table 9D is used for processing based on a function provided by the control program 9A. FIG. 2 is a table of an exemplary configuration of the unlocking condition determination table 9D. As represented in FIG. 2, the unlocking condition determination table 9D is configured by associating matching rates each between fingerprint data that is input via the fingerprint sensor 17 and collation fingerprint data and authentication levels. Authentication level 2 represented in FIG. 2 is a standard level employed as an initial setting for the smartphone 1 to perform biometric authentication processing. In the case of Authentication level 1 lower than Authentication level 2, the unlocking condition is eased compared to that in the case of Authentication level 2. In the case of Authentication level 3 higher than Authentication level 2, the unlocking condition is tightened compared to that in the case of Authentication level 2. When changing the authentication level, the control program 9A is able to, for example, lower the authentication level from Authentication level 2 to Authentication level 1 or increase it from Authentication level 2 to Authentication level 3.

The authentication biometric data 9E contains the collation fingerprint data used for collation with the fingerprint data that is input by the user via the fingerprint sensor 17.

The travel state data 9F contains the result of determining the travel state of the user.

The setting data 9Z contains information on various settings on operations of the smartphone 1.

The controller 10 includes an arithmetic processor. The arithmetic processor includes a central processing unit (CPU), a system-on-a-chip (SoC), a micro control unit (MCU), a field-programmable gate array (FPGA) and a compressor; however, the arithmetic processing device is not limited thereto. The controller 10 integrally controls operations of the smartphone 1 to implement various functions. The controller 10 is an exemplary controller.

Specifically, while referring to the data stored in the storage 9 as required, the controller 10 executes commands contained in the programs stored in the storage 9. The controller 10 then controls function modules according to data and commands, thereby implementing various functions. The function modules include, for example, the display 2A, the communication module 6, the microphone 8, and the speaker 11; however, the function modules are not limited thereto. The controller 10 may change control according to the result of detection performed by a detector. The detector includes, for example, the touch screen 2B, the button 3, the illuminance sensor 4, the proximity sensor 5, the microphone 8, the camera 12, the camera 13, the acceleration sensor 15, the orientation sensor 16, and the fingerprint sensor 17; however, the detector is not limited thereto.

The controller 10 executes the control program 9A to implement a process of changing the authentication level used to perform unlocking on locking based on the locking function according to the travel state of the user.

The speaker 11 outputs acoustic signals sent from the controller 10 as sound. The speaker 11 is used to output a ringtone and music. Any one of the receiver 7 and the speaker 11 may also have the function of the other.

Each of the camera 12 and the camera 13 converts a captured image into electric signals. The camera 12 is an in-camera that captures an image of an object opposed to the display 2A. The camera 13 is an out-camera that captures an image of an object opposed to the opposite side of the display 2A. The camera 12 and the camera 13 may be mounted on the smartphone 1 in a state where they are functionally and physically integrated into a camera that is usable by the in-camera and the out-camera being switched.

The connector 14 is a terminal to which another device is connected. The connector 14 may be a general-purpose terminal, such as a universal serial bus (USB), a high-definition multimedia interface (HDMI) (trademark), a Light Peak (Thunderbolt (trademark)), or an earphone-microphone connector. The connector 14 may be a dedicated terminal, such as a Dock connector. Devices to be connected to the connector 14 include, for example, an external storage, a speaker, and a communication device; however, the devices are not limited thereto.

The acceleration sensor 15 detects the direction and magnitude of acceleration applied to the smartphone 1.

The orientation sensor 16, for example, detects the orientation of geomagnetism and detects the direction (orientation) of the smartphone 1 on the basis of the orientation of geomagnetism.

The fingerprint sensor 17 acquires fingerprint data. The fingerprint sensor 17, for example, acquires fingerprint data that is input by the user in accordance with the unlocking operation. For the fingerprint sensor 17, it is possible to use a sensor employing a detection method, such as an optical method, a capacitance method, a field intensity measurement method, a pressure-sensitive, or a heat-sensitive method. The fingerprint sensor 17 is an exemplary biometric information acquisition module. The biometric information acquisition module is a sensor for acquiring retinal data unique to the user by scanning the retina of the user. The retinal data contains, for example, information of an image of blood vessels on the retina. The biometric information acquisition module may be a sensor for acquiring iris data unique to the user by scanning the iris of the user. The iris data contains, for example, information of an image of the iris. The biometric information acquisition module may be a sensor for acquiring biogas data unique to the user by detecting a biogas that is emitted from the skin of the user. The biogas data contains, for example, information of the volumes of the components of the biogas. The biometric information acquisition module may be, for example, a sensor for acquiring vein data unique to the user by scanning the veins of the user. The vein data contains, for example, data of an image of the veins. The biometric information acquisition module may be a camera for acquiring data on the face of the user by capturing an image of the face of the user. The face data contains, for example, information of the image of the face. The biometric information acquisition module may be, for example, a microphone for acquiring voice data unique to the user by detecting the voice of the user. The voice data contains, for example, information on the voiceprint. The smartphone 1 may extract pre-set characteristics by pre-processing on the acquired biometric data, such as retinal data, retinal blood vessel data, iris data, smell data, face data, and voice data. The smartphone 1 collates the characteristics that are extracted from the acquired biometric data and the per-stored collation biometric data to calculate a matching rate. When collating the characteristics that are extracted from the acquired biometric data and the collation biometric data, the smartphone 1 may use, for collation, characteristics that are extracted from the collation biometric data as those of the biometric data are.

The smartphone 1 may include, in addition to the above-described function modules, a GPS receiver and a vibrator. The GPS receiver receives radio signals of a given frequency band from a GPS satellite. The GPS receiver performs demodulation on the received radio signals and sends the processed signals to the controller 10. The GPS receiver supports arithmetic processing to calculate the current position of the smartphone 1. The vibrator vibrates part of or all the smartphone 1. In order to cause vibrations, for example, the vibrator includes a piezoelectric element or an eccentric motor. The smartphone 1 mounts a function module, such as a battery, that is obviously used to maintain the functions of the smartphone 1 and a controller that is obviously used to implement control on the smartphone 1.

Figure 4:
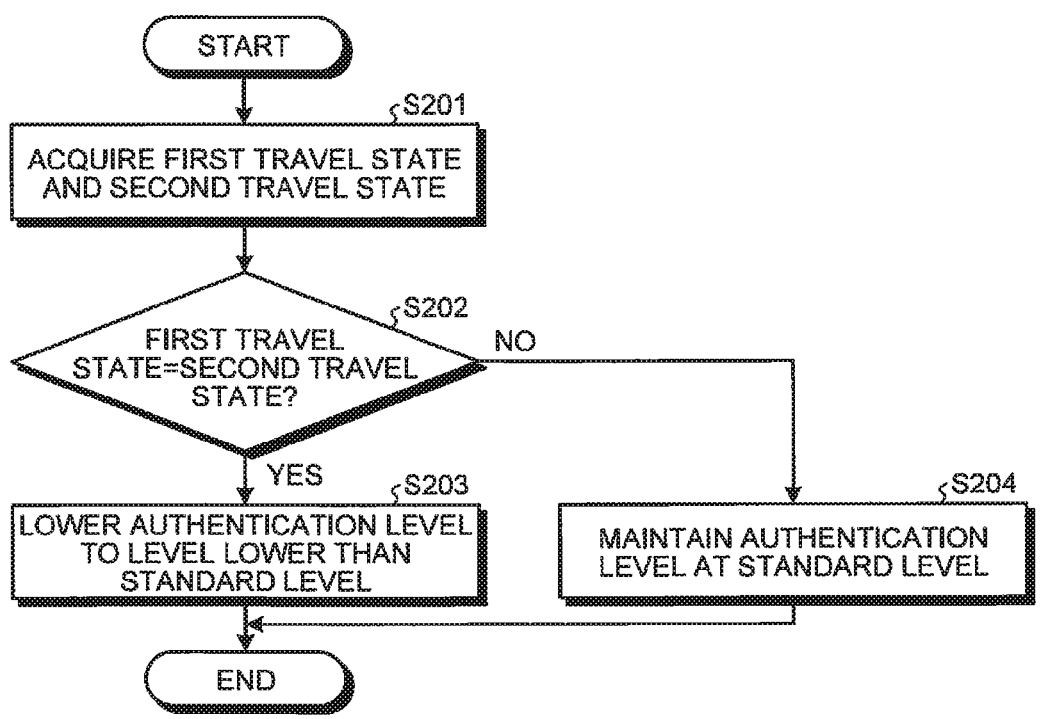
FIG. 4 is a flowchart of an exemplary authentication level determination process performed by the smartphone.

The flow of a process executed by the smartphone 1 according to one embodiment will be described with reference to FIGS. 3 and 4. FIG. 3 is a flowchart of an exemplary unlocking process performed by the smartphone 1. FIG. 4 is a flowchart of an authentication level determination process performed by the smartphone 1. The controller 10 implements the processes illustrated in FIGS. 3 and 4 by executing the control program 9A stored in the storage 9.

The unlocking process executed by the smartphone 1 will be described with reference to FIG. 3. As illustrated in FIG. 3, the controller 10 acquires fingerprint data associated with an unlocking operation of the user (step S101).

The controller 10 then executes an authentication level determination process (step S102). The authentication level determination process will be described below.

The controller 10 then calculates a matching rate between the fingerprint data and collation fingerprint data (step S103).

The controller 10 then acquires, from the unlocking condition determination table 9D, the unlocking condition corresponding to the authentication level that is determined by performing the authentication level determination process at step S102 (step S104).

The controller 10 then determines whether the matching rate calculated at step S103 satisfies the unlocking condition (step S105).

When the determination result represents that the matching rate satisfies the unlocking condition (YES at step S105), the controller 10 performs unlocking (step S106) and ends the process illustrated in FIG. 3.

On the other hand, when the determination result represents that the matching rate does not satisfy the unlocking condition (NO at step S105), the controller 10 issues a notification indicating that it is not possible to perform unlocking (step S107) and ends the process illustrated in FIG. 3.

The authentication level determination process executed by the smartphone 1 will be descried with reference to FIG. 4. As illustrated in FIG. 4, the controller 10 acquires, from the travel state data 9F stored in the storage 9, a first travel state that is the result of determination made when locking is performed and a second state that is the result of determination made when unlocking is performed (step S201).

The controller 10 then determines whether the first travel state and the second travel state are the same (step S202).

When the determination result represents that the first travel state and the second travel state are the same (YES at step S202), the controller 10 lowers the authentication level to a level lower than the standard level (step S203) and ends the process illustrated in FIG. 4. In the example shown in FIG. 2, the controller 10 lowers the authentication level to authentication level 1 lower than authentication level 2 that is the standard level.

When the determination result represents that the first travel state and the second travel state are not the same (NO at step S202), the controller 10 maintains the authentication level at the standard level (step S204) and ends the process illustrated in FIG. 4. In the example illustrated in FIG. 2, the controller 10 maintains the authentication level at authentication level 2 that is the reference level.

Figure 5:
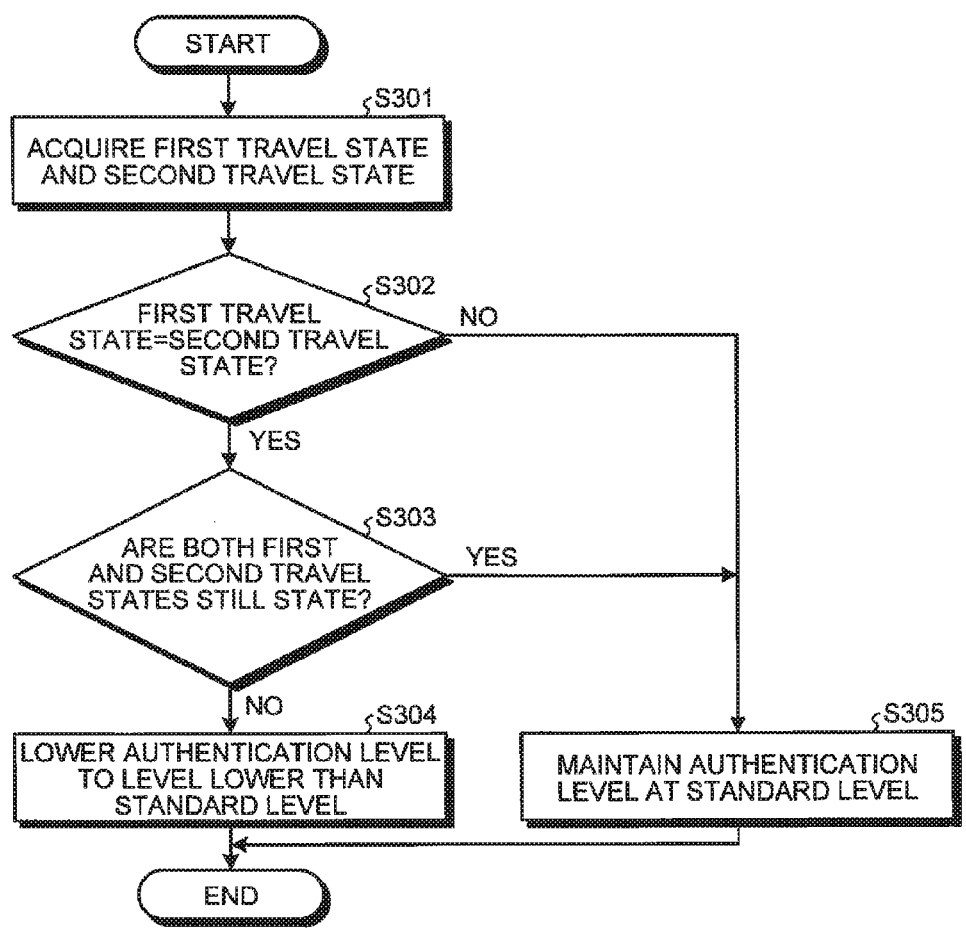
FIG. 5 is a flowchart of another exemplary authentication level determination process performed by the smartphone.

When the first travel state and the second travel state are the same, the smartphone 1 may determine the authentication level according to whether the first travel state and the second travel state are a still state. A flow of a process performed by the smartphone 1 in this case will be described below with reference to FIG. 5. FIG. 5 is a flowchart of another exemplary authentication level determination process performed by the smartphone 1.

As illustrated in FIG. 5, the controller 10 acquires, from the travel state data 9F stored in the storage 9, the first travel state that is the result of determination made when locking is performed and the second travel state that is the result of determination made when unlocking is performed (step S301).

As illustrated in FIG. 5, the controller 10 then determines whether the first travel state and the second travel state are the same (step S302).

When the determination result represents that the first travel state and the second travel state are the same (YES at step S302), the controller 10 determines whether both the first travel state and the second travel state are the still state (step S303).

When the determination result represents that both the first travel state and the second travel state are not the still state (NO at step S303), the controller 10 lowers the authentication level to a level lower than the standard level (step S304) and ends the process illustrated in FIG. 5.

On the other hand, when the determination result represents that both the first travel state and the second travel state are the still state (YES at step S303), the controller 10 maintains the authentication level at the standard level (step S305) and ends the process illustrated in FIG. 5.

At step S302, when the determination result represents that the first travel state and the second travel state are not the same (NO at step S302), the controller 10 proceeds to the process procedure at step S305.

The smartphone 1 may determine whether the first travel state represents travel other than travel by automobile or by train and, furthermore, may determine an authentication level by determining whether the second travel state is a state without travel.

The control program 9A is able to provide a function of, when the first travel state represents travel other than travel by automobile or by train and the second travel state is a state without travel, lowering the authentication level to a level lower than the standard level for a given time. When the control program 9A determines that the travel state of the subject device is, for example, a walking sate or a running state, the control program 9A may determine that the travel state represents travel other than travel by automobile or by train. When the control program 9A determines that the travel state of the subject device is, for example, the stopping state, the control program 9A may determine that the travel state represents a state without travel. After lowering the authentication level to a level lower than the standard level for the given time, the control program 9A recovers the authentication level to the standard level.

By executing the control program 9A, the controller 10 implements a process of lowering the authentication level to a level lower than the standard level for the given time when the first travel state represents travel other than travel by automobile or by train and the second travel state is a state without travel. In a case where there are multiple travel states that are determined as ones representing travel other than travel by automobile or by train, when the first travel state represents travel other than travel by automobile or by train and the second travel state is a state without travel, the controller 10 may change the time for which the process of lowering the authentication level to a level lower than the standard level is executed according to the type of the travel state determined as one representing travel other than travel by automobile or by train.

Figure 6:
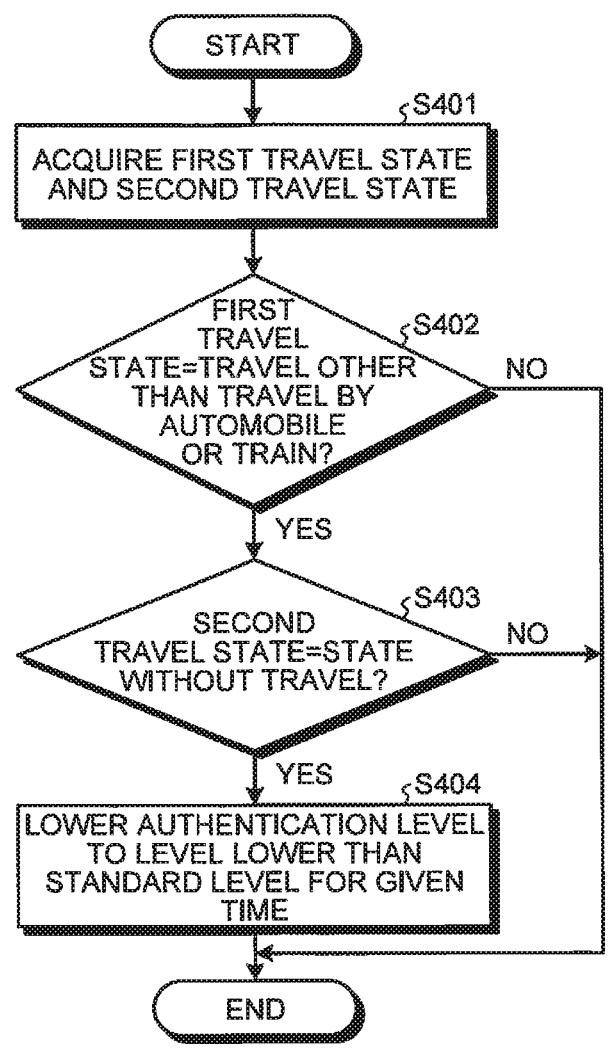
FIG. 6 is a flowchart of still another exemplary authentication level determination process performed by the smartphone.

FIG. 6 is a flowchart of another exemplary authentication level determination process performed by the smartphone 1. As illustrated in FIG. 6, the controller 10 acquires, from the travel state data 9F stored in the storage 9, the first travel state that is the result of determination made when locking is performed and the second travel state that is the result of determination made when unlocking is performed (step S401).

The controller 10 then determines whether the first travel state represents travel other than travel by automobile or by train (step S402).

When the determination result represents that the first travel state represents travel other than travel by automobile or by train (YES at step S402), the controller 10 determines whether the second travel state is a state without travel (step S403).

When the determination result represents that the second travel state is a state without travel (YES at step S403), the controller 10 lowers the authentication level to a level lower than the standard level for a given time (step S404) and ends the process illustrated in FIG. 6.

At step S403, when the determination result represents that the second travel state is a state with travel (NO at step S403), the controller 10 ends the process illustrated in FIG. 6.

At step S402, when the determination result represents that the first travel state represents travel by automobile or by train (YES at step S402), the controller 10 ends the process illustrated in FIG. 6.

The smartphone 1 may change the authentication level when there is a change in the travel state.

While the smartphone 1 is kept powered on, the control program 9A is able to provide a function of keeping determining the travel state. For example, while the smartphone 1 is kept powered on, the control program 9A may determine the travel state periodically and record a log of the travel state. The travel state data 9F may contain the log of the travel state. The control program 9A is able to provide a function of maintaining the authentication level at the standard level when a change in the travel state is detected based on the log of the travel state, and lowering the authentication level to a level lower than the standard level when there is no change in the travel state.

By executing the control program 9A, the controller 10 implements the process of acquiring the log of the travel state, and maintaining the authentication level at the standard level when a change in the travel state is detected on the basis of the log of the travel state, and lowering the authentication level to a level lower than the standard level when there is no change in the travel state.

Figure 7:
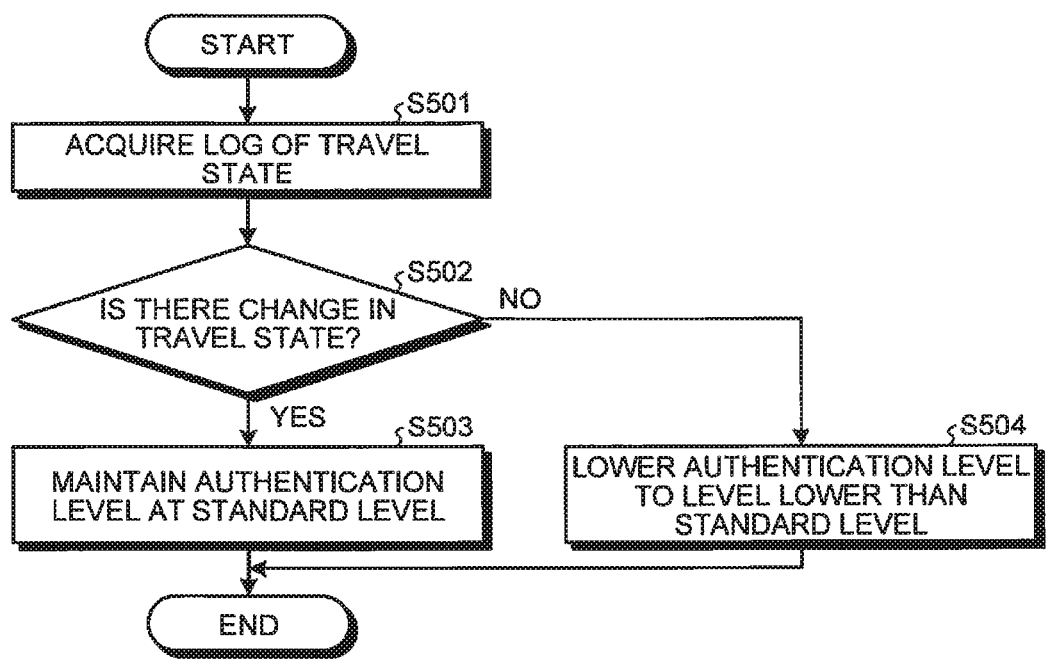
FIG. 7 is a flowchart of still another exemplary authentication level determination process performed by the smartphone.

FIG. 7 is a flowchart of another exemplary authentication level determination process performed by the smartphone 1.

As illustrated in FIG. 7, the controller 10 acquires the log of the travel state from the travel state data 9F stored in the storage 9 (step S501). The controller 10 is able to acquire the log of the travel state during a period necessary for the process illustrated in FIG. 7. For example, the controller 10 may acquire the log of the travel state that is recorded from the last performing of the process illustrated in FIG. 7 to a time just before the current performing of the process. For example, the controller 10 may acquire the log of the travel state recorded after locking until a time just before unlocking on the locking.

The controller 10 then refers to the log of the travel state that is acquired at step S501 and determines whether there is a change in the travel state (step S502).

When the determination result represents that there is a change in the travel state (YES at step S502), the controller 10 maintains the authentication level at the standard level (step S503) and ends the process illustrated in FIG. 7.

When the determination result represents that there is no change in the travel state (NO at step S502), the controller 10 lowers the authentication level to a level lower than the standard level (step S504) and ends the process illustrated in FIG. 7.

Figure 8:
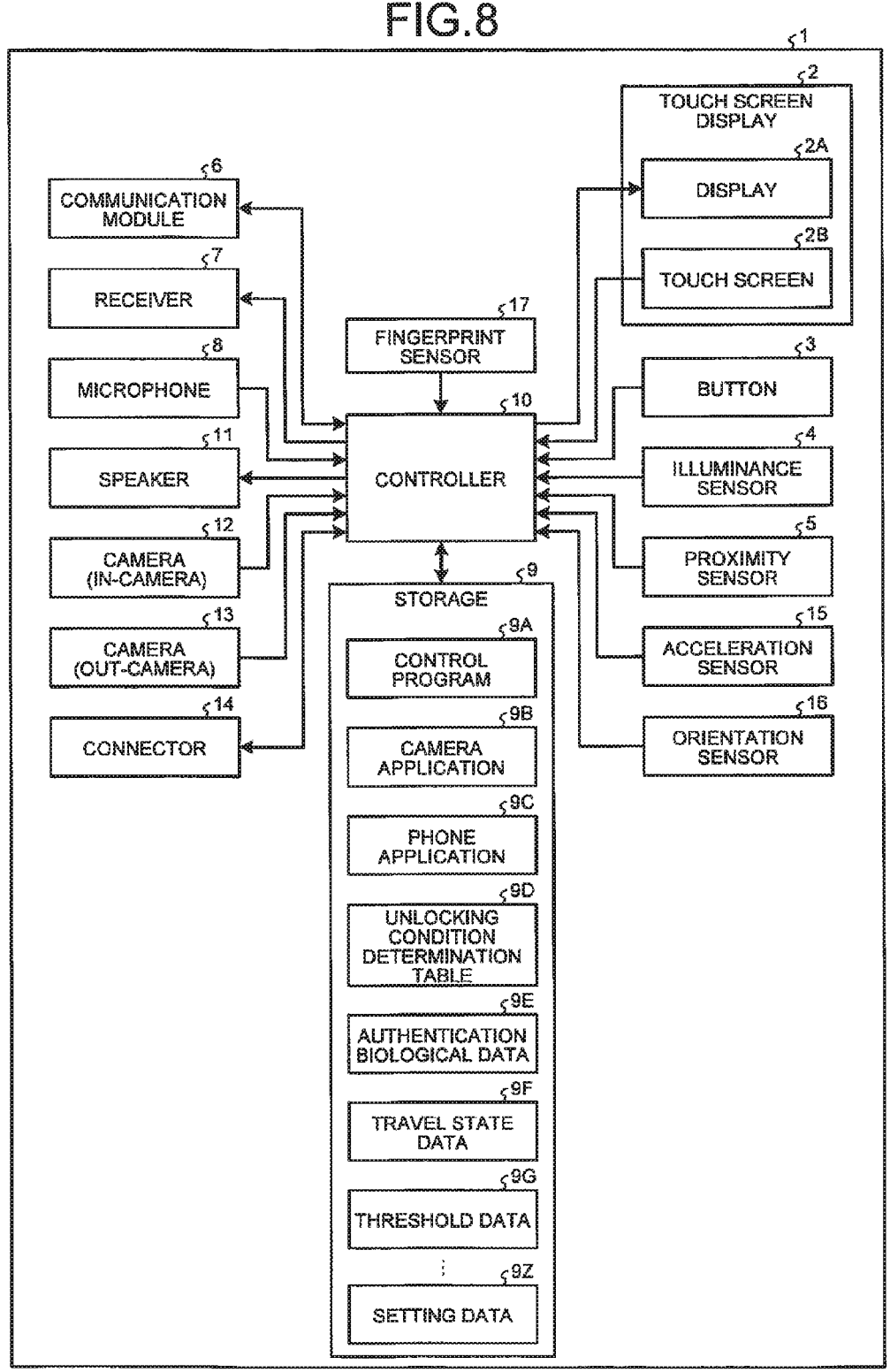
FIG. 8 is a diagram of an exemplary another functional configuration of the smartphone.

When the smartphone 1 determines that there is a change in the travel state in the authentication level determination process, the smartphone 1 may take the travel speed of the subject device into consideration. FIG. 8 is a diagram of another functional configuration of the smartphone 1. The smartphone 1 illustrated in FIG. 8 is different from the smartphone 1 in the aspect described below.

In the travel state data 9F, the data of the travel speed of the subject device is stored in association with the result of determination on the travel state.

The storage 9 stores threshold data 9G. The threshold data 9G contains data of a threshold for evaluating the travel speed of the subject device.

The control program 9A is able to provide a function of determining whether the travel speed of the subject device exceeds the threshold when the travel state changes, increasing the authentication level to a level higher than the standard level for a given time when the travel speed of the subject device exceeds the threshold, and keeping the authentication level at the standard level when the travel speed of the subject device does not exceed the threshold.

By executing the control program 9A, the controller 10 implements the process of determining whether the travel speed of the subject device exceeds the threshold when the travel state changes, increasing the authentication level to a level higher than the standard level for the given time when the travel speed of the subject device exceeds the threshold, and maintaining the authentication level at the standard level when the travel speed of the subject device does not exceed the threshold.

Figure 9:
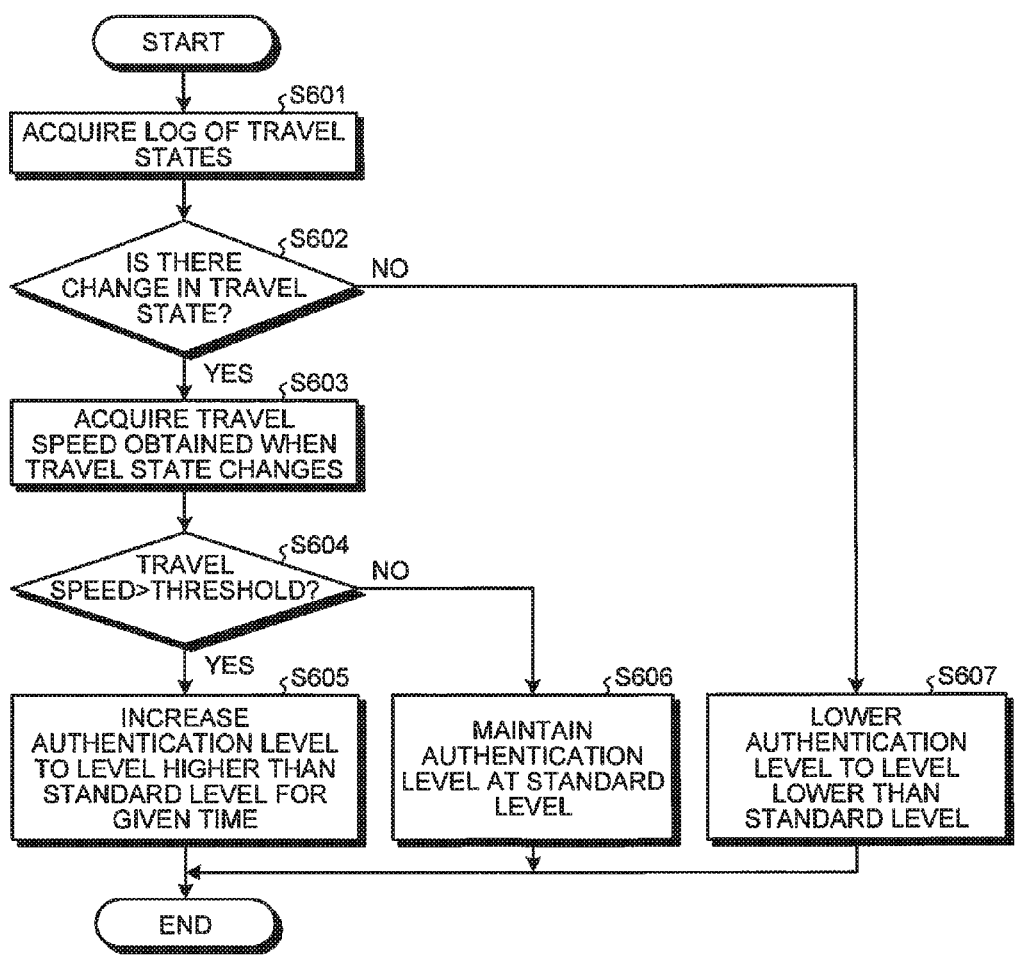
FIG. 9 is a flowchart of still another exemplary authentication level determination process performed by the smartphone.

FIG. 9 is a flowchart of another exemplary authentication level determination process performed by the smartphone 1. As illustrated in FIG. 9, the controller 10 acquires the log of the travel state from the travel state data 9F stored in the storage 9 (step S601).

The controller 10 then refers to the log of the travel state acquired at step S601 and determines whether there is a change in the travel state (step S602).

When the determination result represents that there is a change in the travel state (YES at step S602), the controller 10 acquires, from the travel state data 9F stored in the storage 9, the travel speed at the time when the travel state changes (step S603).

The controller 10 then compares the travel speed acquired at step S603 with the threshold acquired from the threshold data 9G stored in the storage 9 and determines whether the travel speed exceeds the threshold (step S604).

When the determination result represents that the travel speed exceed the threshold (YES at step S604), the controller 10 increases the authentication level to a level higher than the standard level for a given time (step S605) and ends the process illustrated in FIG. 9.

When the determination result represents that the travel speed does not exceed the threshold (NO at step S604), the controller 10 maintains the authentication level at the standard level (step S606) and ends the process shown in FIG. 9.

At step S602, when the determination result represents that the travel speed does not exceed the threshold (NO at step S602), the controller 10 lowers the authentication level to a level lower than the standard level (step S607) and ends the process illustrated in FIG. 9.

As described above, the smartphone 1 according to some embodiments changes the authentication level that determines the unlocking condition according to the travel state of the user. This allows the smartphone 1 according to some embodiments to improve the authentication function of the subject device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising a controller that changes an authentication level that is used to perform unlocking on locking based on a locking function according to a travel state of a user, wherein
   the locking by the locking function is a state where only an unlocking on the locking operation is accepted,
   the travel state includes a state where the subject device is placed on a still object, a stopping state where the user who carries the subject device is stopping, a walking state where the user who carries the subject device is walking, a running state where the user who carries the subject device is running, and an on-state where the user who carries the subject device is on an automobile or a train, and
   the controller is configured to determine the travel state when performing the locking and performing the unlocking on the locking, and changes the authentication level on the basis of a first travel state that is a result of determination made when the locking is performed and a second travel state that is a result of determination made when the unlocking is performed.

2. The electronic device according to claim 1, wherein
   the controller acquires first biometric information that is acquired by a biometric information acquisition sensor in association with an unlocking operation, determines an unlocking condition on the basis of the changed authentication level, calculates a matching rate between the first biometric information and second biometric information that is set and registered in advance, and when it is determined that the matching rate satisfies the determined unlocking condition, performs unlocking on the locking, and
   the biometric information acquisition sensor is at least one of a fingerprint sensor, a retinal data sensor, an iris data sensor, a biogas data sensor, a vein data sensor, a camera for acquiring face data, or a microphone for acquiring voice data.

3. The electronic device according to claim 2, wherein the biometric information acquisition module is configured to acquire, as the first and second biometric information, at least one of a fingerprint data, retinal data, iris data, biogas data, vein data, face data and voice data.

4. The electronic device according to claim 3, wherein the controller is configured to calculate, when the first and second biometric information is a fingerprint data, the matching rate by extracting, from the first biometric information, points of ending of a fingerprint data and points of bifurcation of a fingerprint.

5. The electronic device according to claim 4, wherein the controller is configured to set the unlocking condition to one of 70% or more, 80% or more, and 90% or more, based on the changed authentication level.

6. The electronic device according to claim 1, wherein the controller lowers the authentication level to a level lower than a standard level when the first travel state and the second travel state are the same, and
maintains the authentication level at the standard level when the first travel state and the second travel state are different from each other.

7. The electronic device according to claim 6, wherein the controller is capable of determining, as the travel state, a still state in which a subject device is placed on a still object, and
in a case where both the first travel state and the second travel state are the still state, even when both the first travel state and the second travel state are the same, the controller maintains the authentication level at the standard level.

8. The electronic device according to claim 1, wherein the controller is capable of determining, as the travel state, any one of a state where the user travels without using an automobile or a train and a state where the user does not travel and,
when the first travel state is a state where the user travels without using an automobile or a train and the second travel state is a state where the user does not travel, the controller lowers the authentication level to a level lower than a standard level for a given time.

9. An electronic device comprising a controller that changes an authentication level that is used to perform unlocking on locking based on a locking function according to a travel state of a user, wherein the controller
determines whether there is a change in the travel state during a period after the locking is performed until the unlocking is performed on the locking,
maintains the authentication level at a standard level when the result of the determination represents that there is a change in the travel state, and
lowers the authentication level to a level lower than the standard level when the result of the determination represents that there is not a change in the travel state.

10. An electronic device comprising a controller that changes an authentication level that is used to perform unlocking on locking based on a locking function according to a travel state of a user, wherein
the controller calculates a travel speed of a subject device, determines whether there is a change in the travel state during a period after the locking is performed until the unlocking is performed on the locking,
when the result of the determination represents that there is a change in the travel state, the controller determines whether the travel speed exceeds a threshold, the travel speed being obtained when the travel state changes and
when the travel speed exceeds the threshold, the controller increases the authentication level to a level higher than a standard level for a given time.

11. A control method comprising:
performing first control to perform locking based on a locking function;
performing second control to determine a travel state of a user according to the performing of the locking;
performing third control to, after the second control, determine the travel state again in response to acceptance of an input of first biometric information,
performing fourth control to change an authentication level that is used to perform unlocking on the locking on the basis of a result of determining the travel state at the second control and a result of determining the travel state at the third control;
performing fifth control to determine an unlocking condition on the basis of the authentication level;
performing sixth control to calculate a matching rate between the first biometric information and second biometric information that is set and registered in advance; and
performing seventh control to perform unlocking on the locking when the matching rate satisfies the unlocking condition, wherein
the locking by the locking function is a state where only an unlocking on the locking operation is accepted,
the travel state includes a state where the subject device is placed on a still object, a stopping state where the user who carries the subject device is stopping, a walking state where the user who carries the subject device is walking, a running state where the user who carries the subject device is running, and an on-state where the user who carries the subject device is on an automobile or a train, and
determining the travel state when performing the locking and performing the unlocking on the locking, and changes the authentication level on the basis of a first travel state that is a result of determination made when the locking is performed and a second travel state that is a result of determination made when the unlocking is performed.

* * * * *